United States Patent

[11] 3,545,660

| [72] | Inventor | James Stephen<br>Royal Oak, Michigan |
|---|---|---|
| [21] | Appl. No. | 734,950 |
| [22] | Filed | June 6, 1968 |
| [45] | Patented | Dec. 8, 1970 |
| [73] | Assignee | Helm Design & Manufacturing, Inc.<br>Detroit, Michigan<br>a corporation of Michigan |

[54] LUGGAGE RACK FOR AUTOMOBILES
10 Claims, 4 Drawing Figs.

[52] U.S. Cl. ................................................ 224/42.1
[51] Int. Cl. ................................................ B60r 9/04
[50] Field of Search ........................................ 224/42.1,
29; 280/179; 296/37

[56] References Cited
UNITED STATES PATENTS

| 2,739,748 | 3/1956 | Hoover | 224/42.1(G)UX |
| 3,152,416 | 10/1964 | MacLean | 224/42.1(A)UX |
| 3,253,755 | 5/1966 | Bott | 224/42.1(E)UX |
| 3,325,067 | 6/1967 | Helm | 224/42.1(A)UX |
| 3,330,454 | 7/1967 | Bott | 224/42.1(E)UX |

FOREIGN PATENTS

| 1,092,494 | 4/1955 | France | 224/42.1(E)UX |
| 458,600 | 7/1950 | Italy | 224/42.1(E)UX |

Primary Examiner—Gerald M. Forlenza
Assistant Examiner—Frank E. Werner
Attorney—Barnes, Kisselle, Raisch and Choate ABSTRACT: A luggage rack comprising side rails that are supported on the top of the automobile by stanchions and include a front fixed cross rail extending between the forward ends of the side rails and a movable rear cross rail extending and movable longitudinally between the side rails. The ends of the movable cross rail are formed with antifriction means that facilitate the movement of the cross rail with respect to the side rail and with a manually operable lock for locking and quickly releasing the cross rail with respect to the side rails.

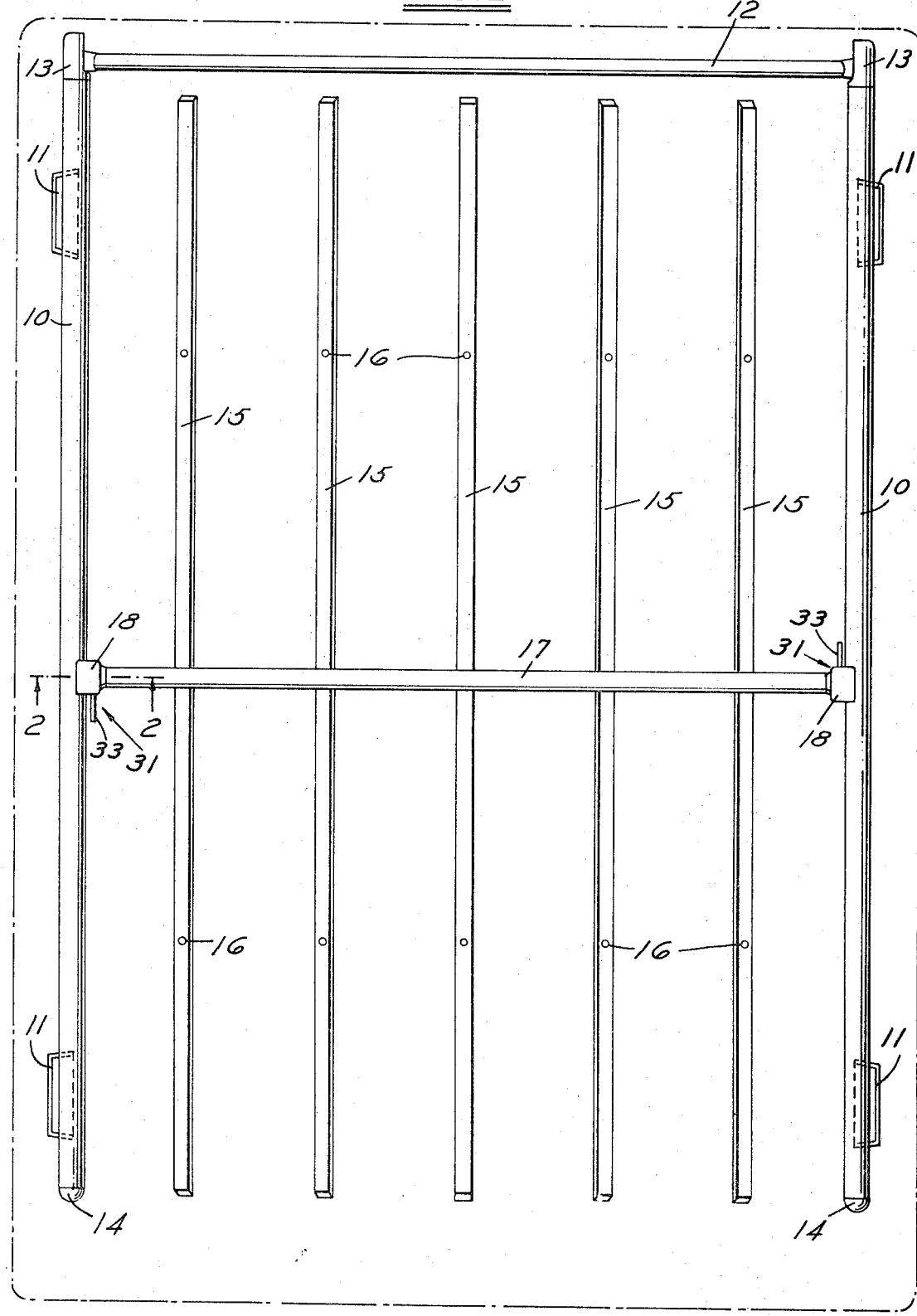

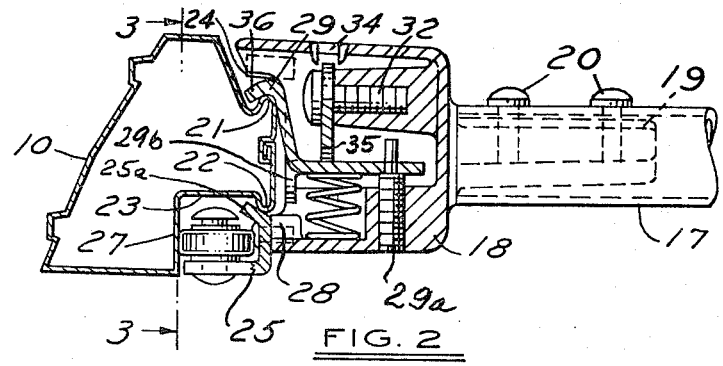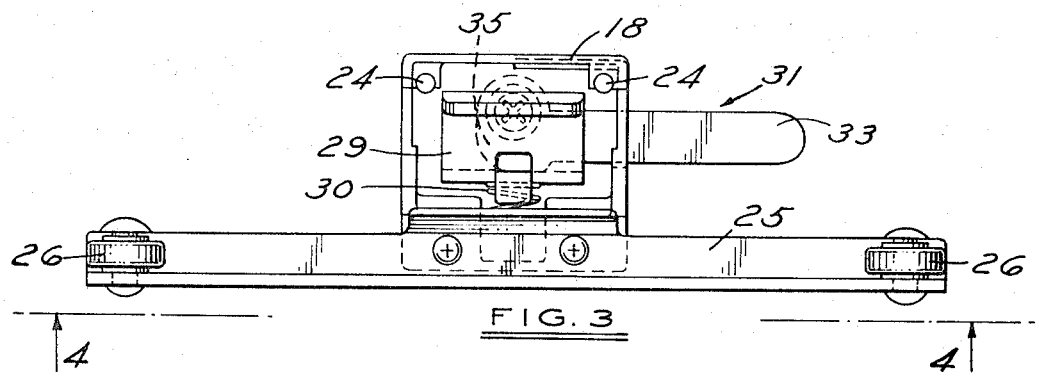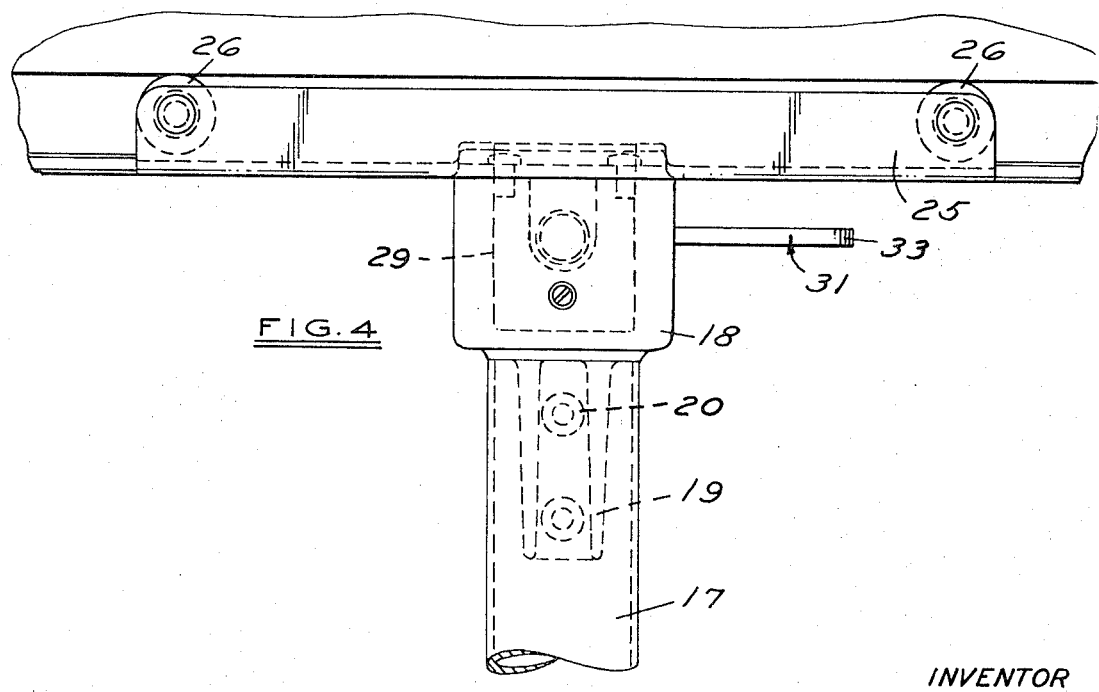

LUGGAGE RACK FOR AUTOMOBILES

This invention relates to luggage racks for automobiles.

It has heretofore been suggested that an automobile luggage rack can be provided with an adjustable cross rail to facilitate the holding of luggage or other loads on a luggage rack. Such a rack is shown for example, in the U.S. Pat. to Helm No. 3,325,067 issued June 13, 1967.

Among the objects of the present invention are to provide a luggage rack of the aforementioned type wherein the cross rail is so constructed that it can be readily moved with respect to the side rails; wherein the cross rail can be readily locked and unlocked with respect to the side rails; which is easily manipulatable by unskilled persons; and which is relatively simple in construction facilitating the manufacture and resulting in a low cost.

In the drawings:

FIG. 1 is a plan view of a luggage rack embodying the invention;

FIG. 2 is a fragmentary sectional view taken along the line 2–2 in FIG. 1;

FIG. 3 is a fragmentary sectional view taken along the line 3–3 in FIG. 2, parts being broken away; and FIG. 4 is a fragmentary bottom plan view taken along the line 4–4 in FIG. 3.

Referring to FIG. 1, the luggage rack embodying the invention comprises side rails 10 that are mounted on the car top by longitudinally spaced stanchions 11. A cross rail 12 extends between the forward ends of the side rails 10 and is connected thereto by front corner members 13, each of which has projections that extend into the tubular forward ends of the side rails 10 and the tubular ends of the cross rail 12. Decorative members 14 close the rear ends of the side rails 10. In accordance with well-known practice, longitudinally extending slats or strips 15 are fixed to the car top by screws 16 to support the luggage or load.

The rack further includes a tubular movable cross rail 17 that is adapted to be moved longitudinally between the side rails 10 and locked in any adjusted position relative thereto.

Referring to FIGS. 2—4, a bracket or housing 18 is provided at each end of the movable cross rail 17 and includes a projection 19 extending into the cross rail 17 and fixed thereto by screws 20. The bracket or housing 18 has an outwardly facing cavity that faces the side rail 10.

As shown in FIG. 2, the side rail 10 is preferably made of rolled sheet metal and has a generally L-shaped cross section including a longitudinally extending top rib 21, bottom rib 22, and downwardly facing channel 23. housing 18 has fixed thereon short horizontally extending cylindrical rods 24 of low friction material such as nylon or Teflon which are adapted to bear against the top of the upwardly facing rib 21 when the cross rail is unlocked as presently described. The housing 18 further supports a generally L-shaped horizontal metal strip 25 that extends longitudinally beyond the confines of the housing and rotatably supports rollers 26 of low friction material such as nylon or Teflon for rotation about vertical axes. The rollers 26 normally engage vertical wall 27 of the channel 23 in side rail 10 (FIG. 2).

By the construction described, the cross rail 17 can be easily grasped at any point along its length, including at each end, and moved longitudinally without binding.

As further shown in FIGS. 2—4, the housing 18 includes a fixed portion 28 that extends beneath the rib 22 and cooperates with a flange 25a on strip 25 to engage the rib 21 when the cross rail is locked. A movable clamp member 29 has one end overlying the rib and the other end pivoted on an adjusting screw 29a. The clamp member 29 is normally urged upwardly out of engagement with the rib 21 by a spring 30 interposed between the bottom of the housing 18 and the undersurface of the member 29. A bar 29b is bent downwardly from clamp member 29 to retain spring 30. A cam lever 31 is pivoted by a screw 32 within the housing 18 and has a handle 33 extending outwardly through a slot 34. Cam lever 31 supports a cam portion 35 that engages the top surface of the member 29. By grasping the handle 33 the lever 31 can be rotated to move the cam portion 35 in a manner to force the clamp member 29 downwardly against the action of the spring. Downward movement of clamp member 29 brings the lip 36 thereof into engagement with the upper rib 21 to lock the cross rail 17 in any adjusted position.

A similar lock mechanism is provided on each end of the cross rail 17.

When the lever 31 is rotated in the opposite direction, the clamp member 29 is disengaged from the upper rib 21 permitting the bracket 18 to drop downwardly and thereby bring the low friction rods 24 into engagement with the upper rib 21 so that the cross rail 17 can be readily moved along the side rails 10. When the clamp member 29 is again engaged with the rib 21, the bracket 18 is moved upwardly moving the rods 24 out of engagement with the rib 21. By moving the adjusting screw 29a, the gripping or locking force on the side rail can be adjusted.

I claim:

1. In an automobile luggage rack, the combination comprising:
   longitudinally extending side rails;
   a cross rail;
   said cross rail having a bracket on each end thereof engaging the side rails;
   and cam lock means on at least one said bracket operable to lock said bracket and in turn said cross rail on the adjacent side rail;
   said lock means including portions engaging opposed portions of said side rails;
   one of said portions being fixed;
   the other said portion being movable toward and away from said first-mentioned portion to frictionally engage said side rail;
   and cam means for controlling the position of said movable portion;
   said last-mentioned means comprising a spring yieldingly urging said movable portion away from said side rail;
   and a manually operated cam member for moving said movable portion toward said side rail against the action of said spring.

2. The combination set forth in claim 1 including bearing means having bearing portions engaging a top longitudinally extending portion of the side rail when the cam lock means is unlocked and second bearing means engaging a side longitudinally extending portion of said side rail.

3. The combination set forth in claim 1, wherein said can member comprises a lever pivotally mounted on said body and having a cam thereon engaging said movable portion.

4. The combination set forth in claim 1 wherein said bracket includes fixed antifriction members engaging a top portion of the side rail when the cam lock means is unlocked and rotatable antifriction members engaging a side portion of said side rail.

5. In an automobile luggage rack, the combination comprising:
   longitudinally extending side rails;
   a cross rail;
   each said rail having inwardly facing upper and lower ribs thereon;
   said cross rail having a bracket on each end thereof including means engaging the ribs of said side rails;
   cam lock means on each said bracket operable to lock said bracket and in turn said cross rail to said adjacent ribs on the adjacent side rail;
   each said cam lock means including portions engaging said upper and lower ribs of said side rails;
   one of said portions being fixed;
   the other said portion being movable toward and away from said first-mentioned portion to frictionally engage said side rail;
   means for controlling the position of said movable portion;
   said last-mentioned means comprising a spring yieldingly urging said movable portion away from said side rail; and a manually operated cam member for moving said movable portion toward said side rail against the action of said spring.

6. The combination set forth in claim 5 including bearing means having bearing portions engaging the upper ribs of the side rail when the cam lock means is unlocked and second bearing means engaging a side portion of said side rail.

7. The combination set forth in claim 5 wherein said cam member comprises a lever pivotally mounted on said body and having a cam thereon engaging said movable portion.

8. The combination set forth in claim 5 wherein said bracket includes fixed antifriction members engaging the upper ribs of the side rail when the cam lock means is unlocked and rotatable antifriction members engaging a side portion of said side rail below said lower ribs of said side rail.

9. In an automobile luggage rack, the combination comprising:
longitudinally extending side rails;
a cross rail;
said cross rail having a bracket on each end thereof engaging the side rails;
and cam lock means on at least one said bracket operable to lock said bracket and in turn said cross rail on the adjacent side rail;
said lock means including portions engaging opposed portions of said side rails;
one of said lock portions being fixed;
the other said lock portion being movable toward and away from said first-mentioned portion to frictionally engage said side rail; and
and cam means movable relative to the movable lock portion for controlling the position of said movable portion.

10. In an automobile luggage rack, the combination comprising:
longitudinally extending side rails;
a cross rail;
each said rail having inwardly facing upper and lower ribs thereon;
said cross rail having a bracket on each end thereof including means engaging the ribs of said side rails;
and cam lock means on each said bracket operable to lock said bracket and in turn said cross rail to said adjacent ribs on the adjacent side rail;
each said cam lock means including portions engaging said upper and lower ribs of said side rails;
one of said lock portions being fixed;
the other said lock portion being movable toward and away from said first-mentioned portion to frictionally engage said side rail; and
cam means movable relative to the movable lock portion for controlling the position of said movable portion.